US008851648B2

(12) United States Patent
Drappel et al.

(10) Patent No.: US 8,851,648 B2
(45) Date of Patent: Oct. 7, 2014

(54) BLENDS OF SEMI-CRYSTALLINE MATERIALS FOR INKS FOR DIRECT-TO-PAPER PRINTING

(71) Applicants: Stephan V. Drappel, Toronto (CA); Jeffrey H. Banning, Hillsboro, OR (US); Peter G. Odell, Mississauga (CA); Paul J. McConville, Webster, NY (US); Jennifer Rea, Rush, NY (US)

(72) Inventors: Stephan V. Drappel, Toronto (CA); Jeffrey H. Banning, Hillsboro, OR (US); Peter G. Odell, Mississauga (CA); Paul J. McConville, Webster, NY (US); Jennifer Rea, Rush, NY (US)

(73) Assignee: Xerox Corporation, Norwalk, CT (US)

( * ) Notice: Subject to any disclaimer, the term of this patent is extended or adjusted under 35 U.S.C. 154(b) by 150 days.

(21) Appl. No.: 13/622,287

(22) Filed: Sep. 18, 2012

(65) Prior Publication Data

US 2014/0078227 A1    Mar. 20, 2014

(51) Int. Cl.
*B41J 2/01* (2006.01)
*B41J 2/21* (2006.01)
*C09D 11/34* (2014.01)

(52) U.S. Cl.
CPC .............. *C09D 11/34* (2013.01); *B41J 2/2107* (2013.01)
USPC .................. 347/99; 347/88; 347/95; 347/100

(58) Field of Classification Search
CPC .... B41J 2/2107; B41J 2/17593; C09D 11/34; C09D 11/92
USPC ...................... 347/88, 95–100; 523/160, 161; 106/31.29–31.31, 31.61–31.63
See application file for complete search history.

(56) References Cited

U.S. PATENT DOCUMENTS

| | | |
|---|---|---|
| 4,692,636 A | 9/1987 | Wang |
| 4,705,719 A | 11/1987 | Yamanaka |
| 4,868,581 A | 9/1989 | Mouri et al. |
| 4,903,040 A | 2/1990 | Light |
| 4,903,041 A | 2/1990 | Light |
| 5,195,430 A | 3/1993 | Rise |
| 5,389,958 A | 2/1995 | Bui |
| 5,451,458 A | 9/1995 | Malhotra |
| 5,534,479 A | 7/1996 | Shuttleworth |
| 5,627,128 A | 5/1997 | Bowman |
| 6,416,874 B1 | 7/2002 | McAneney |
| 2007/0120908 A1* | 5/2007 | Odell et al. ..................... 347/88 |
| 2009/0223409 A1* | 9/2009 | Banning et al. ............ 106/31.13 |
| 2012/0274700 A1* | 11/2012 | Belelie et al. .................. 347/20 |

* cited by examiner

*Primary Examiner* — Matthew Luu
*Assistant Examiner* — Rut Patel
(74) *Attorney, Agent, or Firm* — Pillsbury Winthrop Shaw Pittman LLP (57) ABSTRACT

Exemplary embodiments provide a phase change ink composition including at least a first semi-crystalline material having a high amorphous content; and at least a second semi-crystalline material having a high crystalline content, such that the phase change ink has a viscosity ranging from about 0.1 cps to about 15 cps at a temperature ranging from about 60° C. to about 145° C. and the phase change ink composition has excellent robustness when forming images or printing on a printing substrate.

16 Claims, 2 Drawing Sheets

BLENDS OF SEMI-CRYSTALLINE MATERIALS FOR INKS FOR DIRECT-TO-PAPER PRINTING

BACKGROUND

Solid ink technology has been successfully used in direct-to-paper printing showing many advantages including vivid images, economy of jet use, and substrate latitude among porous papers. However, there remains a need for a solid ink technology to produce advantages on paper that includes robustness against scratch, fold offset, and smear.

SUMMARY

The present disclosure relates to solid ink technology. In some embodiments, the present disclosure relates to solid ink formulations containing at least two different semi-crystalline materials to provide tack and impart robustness to the printed ink, e.g., by direct-to-paper printing or other printing technologies.

According to various embodiments, there is provided a phase change ink including at least a first semi-crystalline material having a higher amorphous content than a crystalline content therein; and a second semi-crystalline material having a higher crystalline content than an amorphous content therein, such that the phase change ink has a viscosity ranging from about 0.1 centipoises (cps) to about 15 cps at a temperature ranging from about 60° C. to about 145° C.

According to various embodiments, there is provided a phase change ink including at least a first semi-crystalline material having a high amorphous content, which has a viscosity between 10 cps and 1000 cps at a temperature of about 60° C. to 145° C. and a viscosity of greater than $1 \times 10^8$ cps at room temperature. The phase change ink may also include at least a second semi-crystalline material having a high crystalline content having a viscosity of less than 10 cps at a temperature of about 60° C. to 145° C. and a viscosity of greater than $1 \times 10^8$ cps at room temperature. The phase change ink may further include a colorant selected from the group consisting of a pigment, dye or mixtures thereof.

According to various embodiments, there is provided method of printing by incorporating a phase change ink into an ink jet printing apparatus. The phase change ink may include at least a first semi-crystalline material having a high amorphous content, and at least a second semi-crystalline material having a high crystalline content, such that the phase change ink has a viscosity ranging from about 0.1 cps to about 15 cps at a temperature ranging from about 60° C. to about 145° C. The phase change ink can then be melted inside the ink jet printing apparatus. Droplets of the melted ink can then be ejected onto a substrate to form an image.

BRIEF DESCRIPTION OF THE DRAWINGS

For a better understanding of the present embodiments, reference may be had to the accompanying figures.

DETAILED DESCRIPTION

Throughout this description, including the foregoing description of related art, any and all publicly available documents described herein, including any and all U.S. patents, are specifically incorporated by reference herein in their entirety. The foregoing description of related art is not intended in any way as an admission that any of the documents described therein, including pending United States patent applications, are prior art to embodiments of the present disclosure. Moreover, the description herein of any disadvantages associated with the described products, methods, and/or apparatus, is not intended to limit the disclosed embodiments. Indeed, embodiments of the present disclosure may include certain features of the described products, methods, and/or apparatus without suffering from their described disadvantages.

In the following description, it is understood that other embodiments may be utilized and structural and operational changes may be made without departure from the scope of the present embodiments disclosed herein.

Solid ink technology broadens printing capability and customer base across many markets, and the diversity of printing applications will be facilitated by effective integration of printhead technology, print process and ink materials. The solid ink compositions are characterized by being solid (e.g., characterized by a high viscosity) at room temperature and molten at an elevated temperature at which the molten ink (e.g., characterized by a low viscosity) is applied to a substrate. These ink compositions can be used for ink jet printing. Such inks may be referred to as phase change inks, solid inks, hot melt inks, and the like.

The present disclosure relates to solid or phase change ink s that contain two or more semi-crystalline materials or polymers. Each semi-crystalline material may include an amorphous content and a crystalline content. For example, the two or more semi-crystalline materials or polymers may include at least a first semi-crystalline material that has a high degree of amorphous content as compared with the crystalline content therein (e.g., an amorphous to crystalline content ratio of more than about 50:50 such as about 55:45, or about 60:40, or 65:35, or about 70:30, or about 75:25, or about 80:20, etc.); and a second semi-crystalline material having a high degree of crystalline content as compared with the amorphous content therein (e.g., a crystalline to amorphous content ratio of more than about 50:50 such as about 55:45, or about 60:40, or 65:35, or about 70:30, or about 75:25, or about 80:20, etc.).

It has been discovered that using a mixture that at least includes the first semi-crystalline material with high amorphous content and the second semi-crystalline material with high crystalline content in solid ink formulations provides robust inks, and in particular, solid inks which demonstrate robust images on any printing substrates such as, for example, uncoated paper, and/or coated paper.

Generally, semi-crystalline materials having high crystalline content, often having small molecules, are generally harder and more resistant, such materials are also much more brittle, so that printed matter made using a mainly crystalline ink composition is fairly sensitive to damage. Semi-crystalline materials having high amorphous content, such as polymers, become viscous and sticky liquids at high temperature, but do not show sufficiently low viscosity at high temperatures. As a result, the polymers cannot be jetted from print head nozzles at desirable jetting temperature. In the present embodiments, however, it is discovered that a robust solid ink can be obtained through a blend of at least a first semi-crystalline material having high amorphous content and a second semi-crystalline material having high crystalline content. The jetting temperature can be about 150° C. or less, for example, ranging from about 60° C. to about 145° C., from about 60° C. to about 100° C., or from about 100° C. to about 140° C., or from about 120° C. to about 140° C., without limitation.

As used herein, the term "room temperature" refers to the temperature of the ink at ambient temperature, typically between about 4° C. and 40° C. Room temperature may be between about 15° to 40° C., or 20° C. to 30° C., or 20° C. to 24° C., and 22° C. to 28° C. Such temperatures may include, for example, 20° C., 22° C., 24° C., 25° C., 26° C., 27° C., 28° C., 29° C., etc.

In embodiments, the combination of the at least two semi-crystalline materials provides solid ink formulations that achieves 1) a relatively low viscosity (e.g., about 15 cps or lower) near the jetting temperatures, and/or 2) a very high viscosity (e.g., about $10^6$ cps or greater) at room temperature. In embodiments, the viscosity of the solid ink formulations at jetting temperatures can be about 0.1 cps to about 15 cps, for example, from about 0.1 cps to about 12 cps, from about 10 cps to about 11 cps, or from about 7 cps to about 15 cps, without limitation. In some embodiments, the viscosity of the solid ink formulations at room temperature is greater than about $10^8$ cps, e.g., greater than about $10^9$ or greater than about $10^{10}$ cps.

As disclosed herein, the viscosity of the solid ink formulations may depend on degree of crystallinity, amount of amorphous content, the molecular weight, etc. of the solid ink formulation, which can be realized by, for example, adjusting a weight/volume ratio between these at least two semi-crystalline materials, and adjusting degree of crystallinity, amount of amorphous content, and molecular weight of each semi-crystalline material involved in the solid ink formulation. Of course the solid ink formulations may further include other additives, such as, for example, a colorant, a stabilizer, etc., which may or may not affect the viscosity of the solid ink formulation.

In some embodiments, the crystallization temperature of the solid ink formulations may be between about 50° C. and 130° C., between about 70° C. and 95° C., and/or between about 70° C. and 80° C.

In some embodiments, the melting point of the crystalline components of the solid ink formulations is below the jetting temperature. For example, the melting point of the crystalline components of the solid ink formulations may be between about 60° C. and 140° C.

In some embodiments, the difference between the crystallization temperature and melting point of the crystalline components of the solid ink formulations is less that about 55° C., including from about 10° C. to 55° C., from about 20° C. to 45° C., and from about 20° C. to 35° C., for example, measured at a heating/cooling rate of 10° C./minute with the differential scanning calorimeter (DSC).

The disclosed type of ink jet solid ink composition including a blend having at least a first semi-crystalline material that having high amorphous content and a second semi-crystalline material having high crystalline content may have a total crystalline and a total amorphous content, for example, in a weight ratio of from about 60:40 to about 95:5, or from about 65:35 to about 95:5, or from about 70:30 to about 90:10, although various embodiments may include other possible weight ratios there-between. For example, the weight ratio can be about 50:50, 70:30, or about 80:20 for the crystalline content to the amorphous content for the entire, respectively.
First Semi-Crystalline Material Component: High Amorphous Content The solid or phase change inks of the present embodiments including at least two (e.g., at least 3, 4, 5, 6, 7, 8, 9, etc.) semi-crystalline materials or polymers for direct-to-paper (DTP) printing.

The semi-crystalline materials can include a blend of crystalline and amorphous materials in a ratio that imparts specific properties to the inks. For example, the solid ink formulations of the present embodiments display a sharp increase in viscosity due to the rapid crystallization of the crystalline part, which is dependent on the chain length of the crystalline moiety, followed by the complete hardening due to the amorphous part cooling below the glass transition temperature (Tg). The amorphous material may be provided in an amount sufficient to provide tack and impart robustness to the printed ink. The crystalline chain contributes to an overall lower viscosity when compared to the completely amorphous resin.

The high amorphous semi-crystalline component of the ink formulations of the present embodiments may display the following characteristics: 1) a viscosity of less than 100 cps at the jetting temperature; 2) a viscosity of greater than about $10^8$ cps at room temperature. In some embodiments, the viscosity of the high amorphous semi-crystalline component at the jetting temperature may be between about 10 cps and 1000 cps, including, for example, about 20 cps to 500 cps, 40 cps to 80 cps, and 60 cps to 70 cps. In some embodiments, the viscosity of the high amorphous semi-crystalline component at the room temperature may be between greater than about $10^5$ cps, greater than about $10^6$ cps or greater than about $10^7$ cps or greater than about $10^9$ cps. In embodiments, the high amorphous semi-crystalline component is in a solid form at room temperature.

In some embodiments, the materials have relatively low viscosity (<$10^1$ cps) in the jetting range and high viscosity (>$10^6$ cps) at room temperature. Because the crystalline components dictate the phase change of the ink, rapid crystallization prevents excessive show through and to allow further immediate print processing (i.e., spreading, duplex printing, etc.). By using differential scanning calorimetry (DSC) (e.g., performed heating/cooling/re-heating cycles at 10° C./min from −50° C. to 200° C. to −50° C.), desirable crystalline components show sharp crystallization and melting peaks, and the ΔT between them is less than 55° C. The melting point must be below 150° C., which is the upper limit of the jetting temperature, or below from about 145° C. to about 60° C., etc. The crystallization temperature is preferably above 65° C. to prevent blocking and print transfer upon standing at temperatures up to about 65° C., or above 70° C.

In some embodiments, the first semi-crystalline material containing a high degree of amorphous content may be selected based on the materials DSC thermogram profile including a crystallization profile for the crystalline component and a Tg (glass transition temperature) for the amorphous component. In some embodiments, the first semi-crystalline material containing high degree of amorphous content may have a peak of crystallization of between about −50° C. and 100° C., including, for example, between about −50° C. and 50° C., between about 40° C. and 80° C., or between about 20° C. and 50° C. In one embodiment, Tg may be determined by using the energy release on heating in DSC.

In some embodiments, the temperature difference (ΔT) between the start of crystallization of a high amorphous semi-crystalline material and the peak of crystallization is less than 20° C. or less than 10° C., including between about 1° C. and 20° C., between about 4° C. and 12° C., between about 5° C. and 15° C. and between about 2° C. and 8° C.

In some embodiments, the melting peak and/or melting completion is below the desired jetting temperature for the ink. In some embodiments, the melting peak may be between about 80° C. and 140° C., including between about 80° C. and 120° C., between about 100° C. and 115° C., between about 90° C. and 100° C., or between about 100° C. and 120° C.

In some embodiments, the start melting may be between about 50° C. to 130° C., including between about 50° C. and about 120° C., between about 60° C. to 100° C., between about 60° C. to 90° C., or between about 60° C. to 75° C.

In some embodiments, the ΔT between the crystallization and melting peak is less than about 55° C., including between about 5° C. and 55° C., between about 30° C. and 55° C., between about 5° C. and 30° C. and between about 10° C. and 30° C.

TABLE 1

| Tetra-amide-based on | @140° C. (cps) | @110° C. (cps) | Onset of crystal-lization (° C.) - Rheology | Onset of crystallization (° C.) - DSC | Peak of crystallization (° C.) - DSC | End of crystallization (° C.) - DSC | Heat of Crystal-lization (J/g) | Onset of melting (° C.) - DSC | Peak of melting (° C.) - DSC | End of melting (° C.) - DSC | Heat of Melting (J/g) |
|---|---|---|---|---|---|---|---|---|---|---|---|
| Unicid 700 | 59.6 | 186.0 | 96.0 | 90.7 | 85.5 | 25.4 | 143.3 | 25.2 | 107.4 | 117.1 | 154.0 |
| Unicid 550 | 61.3 | 234.7 | 92.0 | 85.1 | 80.9 | 17.3 | 116.1 | 17.3 | 106.8 | 115.6 | 133.0 |
| Unicid 425 | 70.3 | 308.7 | 94.0 | 77.2 | 68.6 | 5.6 | 83.0 | 5.6 | 99.2 | 111.0 | 91.3 |
| Unicid 350 | 77.5 | 372.3 | 98.0 | 92.7 | 85.5, 40.9 | −25.0 | 40.0 | 55.9 | 95.0, 107.8 | 117.6 | 19.3 |
| Behenic Acid | — | 1930.5 | 115.0 | 94.8 | 68.5, 47.6 | −13.4 | 27.7 | 62.5 | 95.7, 104.0 | 117.6 | 19.3 |
| Stearic Acid | 172.3 | 2.4E+05 | 120.0 | 100.4 | 94.7 | 52.9 | 9.2 | 67.6 | 113.9 | 122.0 | 14.9 |

TABLE 2

Methylamides with straight chain acids

| | Rheology | | | | DSC | | | |
|---|---|---|---|---|---|---|---|---|
| Acid | Viscosity at 140° C. | Viscosity at 110° C. | Onset of Crystallization (° C.) | Complete re-melt (° C.) | Onset of melting (° C.) | Peak of melting (° C.) | End of melting (° C.) | Heat of Melting (J/g) |
| C18 Stearic Acid | 3.1 | 5.7 | 64 | 75 | 69.6 | 66.6 | 77.7 | 189.0 |
| C22 Behenic Acid | 4.2 | 6.7 | 75 | 90 | 64.6 | 77.3 | 90.7 | 711.5 |
| C22 Unicid 350 | 5.0 | 6.9 | 85 | 100 | 30.7 | 72.7 | 90.8 | 170.0 |
| C22 Unicid 425 | 6.1 | 10.3 | 95 | 103 | 36.5 | 87.9 | 106.4 | 257.5 |
| C36 Unicid 550 | 8.0 | 15.7 | 93 | 112 | 25.0 | 101.6 | 112.4 | 236.1 |
| C48 Unicid 700 | 9.6 | 21.3 | 101 | 115 | 45.9 | 100.1 | 114.5 | 225.3 |

| | DSC | | | | |
|---|---|---|---|---|---|
| Acid | Onset of crystallization (° C.) | Peak of crystallization (° C.) | End of crystallization (° C.) | Heat of Crystallization (J/g) | Hardness 4 mm at RT |
| C18 Stearic Acid | 57.2 | 63.2 | 46.2 | 197.7 | 2.6 |
| C22 Behenic Acid | 66.0 | 81.5 | 46.3 | 193.6 | 3.5 |
| C22 Unicid 350 | 81.8 | 80.9 | 8.8 | 181.0 | 4.0 |
| C22 Unicid 425 | 88.6 | 72.9 | 0.0 | 184.2 | 2.0 |
| C36 Unicid 550 | 94.9 | 83.6 | 25.0 | 225.5 | 1.0 |
| C48 Unicid 700 | 90.9 | 93.2 | 33.2 | 218.0 | 0.5 |

This type of semi-crystalline polymers can be selected from a wide variety of materials such as gel di-amides, tetraamides with straight and branched chains, gel tetra-amides, urethanes, etc. For example, the effect of the chain length of the acid used on the thermal and rheological properties of gel-tetra-amides is shown in Table 1.

The tetra-amide compounds for producing the solid inks of the present embodiments may be dimer acid-based tetra-amides, which include, but is not limited to, the reaction product of a fatty acid, a diamine (ethylene diamine) and a dimer acid. Fatty acids having from 10 to 22 carbon atoms can be employed in the formation of the dimer acid-based tetra-amide. Dimer acid-based tetra-amides can be those produced by Union Camp and comprise the reaction product of ethylene diamine, dimer acid, and the following fatty acids: decanoic acid, myristic acid, stearic acid, docasanic acid. In some embodiments, dimer acid-based tetraamide is the reaction product of Dimer acid, ethylene diamine and stearic acid in a stoichiometric ratio of 1:2:2. The stearic acid fatty acid reactant is suitable because the adduct with dimer acid and ethylene diamine has a low viscosity. Dimer acid-based tetra-amides can be prepared as disclosed in, for example, U.S. Pat. No. 6,174,937, the disclosure of which is incorporated herein by reference in its entirety.

Suitable tetra-amides are disclosed in U.S. Pat. No. 6,878, 198, the disclosure of which is incorporated herein by reference in its entirety.

Examples of suitable gel di-amides are gel di-amides based on trans-1,2-diaminocyclohexane and various straight chain acids such as stearic acid, behenic acid, UNICID 350, UNICID 425, UNICID 450, UNICID 700, OH-containing acids such as aleuritic acid and 12-hydroxystearic acid, and a branched acid such as isostearic acid.

Examples of suitable gel tetra-amides include Dimer Acid, trans-1,2-diaminocyclohexane, UNICID 700 (TA48), Dimer Acid, trans-1,2-diaminocyclohexane, UNICID 550 (TA37), Dimer Acid, trans-1,2-diaminocyclohexane, UNICID 425 (TA28), Dimer Acid, trans-1,2-diaminocyclohexane, UNICID 350 (TA23), Dimer Acid, trans-1,2-diaminocyclohexane, Behenic Acid, Dimer Acid, trans-1,2-diaminocyclohexane, Stearic Acid. UNICID™ acids (e.g., UNICID 350, 425, 450, 550, 700, etc.) are long chain, linear primary carboxylic acids. With carbon chain lengths, e.g., from 7 to 50 including such as 7-20 or 25-50 carbons, these materials offer a range of acid numbers and melt points. Low polydispersities (Mw/Mn) of 1.1 or less result in products with hardness and low melt viscosities. UNICID™ acids are approximately 80% linear carboxylic acids, the remainder being polyethylene to mirror the chain length distribution of the carboxylic acids.

Examples of suitable urethanes include urethanes formed from the reaction of an octylphenol sold under the trade name IGEPAL CA210 and alcohols such as stearyl alcohol, behenyl alcohol, UNILIN 350, UNILIN 425, UNILIN 550, and UNILIN 700. Generally, UNILIN alcohols are long chain, linear primary alcohols.

Second Semi-Crystalline Material Component: High Crystalline Content

The solid or phase change inks of the present embodiments further comprise at least a second semi-crystalline material contains a higher concentration of crystalline content and a lower degree of amorphous content. The purpose of the crystalline material with a higher degree of crystallinity and to have a lower viscosity to compensate for the higher viscosity of the first semi-crystalline material. In embodiments, the first semi-crystalline material can have a viscosity ranging from about 0.1 cps to about 10 cps, for example, ranging from about 0.5 cps to about 8 cps, or from about 1 cps to about 6 cps, without limitation. For certain semi-crystalline material having high crystalline content, the only transitions observed in the DSC thermograms may be the melting and crystallization transitions and no glass transition $T_g$ may be observed.

Desirable crystalline components also display melting points below about 150° C., or any upper limit of the jetting temperature. Desirable crystalline components show sharp crystallization and melting peaks, and the ΔT between them is less than 55° C.

In some embodiments, the second semi-crystalline material containing a high degree of crystalline content may also be selected based on the materials DSC thermogram profile comprising a crystallization profile for the crystalline component and a peak of melting for the amorphous component. In some embodiments, the second semi-crystalline material containing a high degree of crystalline content has a peak of crystallization of between about −50° C. and 100° C., including, for example, between about −50° C. and 50° C., between about 40° C. and 80° C., or between about 20° C. and 50° C.

In some embodiments, the temperature difference (ΔT) between the start of crystallization of a high crystalline semi-crystalline material and the peak of crystallization is less than 20° C. or less than 10° C., including between about 1° C. and 20° C., between about 2° C. and 8° C., between about 4° C. and 12° C., or between about 5° C. and 15° C.

In some embodiments, the melting peak and/or melting completion is below the desired jetting temperature for the ink. In some embodiments, the melting peak may be between about 80° C. and 140° C., including between about 80° C. and 120° C., between about 100° C. and 115° C., between about 90° C. and 100° C., or between about 100° C. and 120° C.

In some embodiments, the start melting may be between about 50° C. to 130° C., including between about 50° C. and about 120° C., between about 60° C. to 100° C., between about 60° C. to 90° C., or between about 60° C. to 75° C.

In some embodiments, the ΔT between the crystallization and melting peak is less than about 55° C., including between about 5° C. and 55° C., between about 30° C. and 55° C., between about 5° C. and 30° C. and between about 10° C. and 30° C.

Examples of suitable crystalline materials are illustrated in Table 2. Among the materials suitable are for example methyl-amides with straight chain acids, which have a low viscosity and sharp crystallization transitions (see FIG. 2). For example, Scheme 1 shows an exemplary methyl amid formed from methyl amine with straight chained C-acids. Examples of suitable methyl-amides with straight chain acids include methyl-amides formed from the reaction of a methylmine with various acids such as stearic acid, behenic acid, UNICID 350, UNICID 425, UNICID 450, and/or UNICID 700.

Scheme 1 n = 0 Stearic Acid
n = 2 Uncid 350 or Behenic acid
n = 5 Unicid 450
n = 10 Unicid 550
n = 15 Uncid 700

Scheme 2 depicts exemplary gel di-amides including 1,2-diaminocyclohexane with straight chain C-acids.

Scheme 2 n = 0 Stearic Acid
n = 2 Uncid 350 or Behenic acid
n = 5 Unicid 450
n = 10 Unicid 550
n = 15 Uncid 700

In embodiments, each of the first and the second semi-crystalline material can have a molecular weight ranging from about 250 g/mol to about 3000 g/mol, e.g., from about 500 g/mol to about 2500 g/mol, or from about 1000 g/mol to about 2000 g/mol.

Optional Additives

The ink of embodiments may further include conventional additives to take advantage of the known functionality associated with such conventional additives. Such additives may include, for example, at least one antioxidant, defoamer, slip and leveling agents, clarifier, viscosity modifier, adhesive, plasticizer and the like.

In embodiments, the phase change ink compositions described herein also include a colorant. The ink of the present embodiments can thus be one with or without colorants. The solid ink may optionally contain colorants such as dyes and/or pigments. The colorants can be either from the cyan, magenta, yellow, black (CMYK) set or from spot colors obtained from custom color dyes or pigments or mixtures of pigments. Dye-based colorants are miscible with the ink base composition, which includes at least two semi-crystalline materials and any other additives. Any dye or pigment may be chosen, provided that it is capable of being dispersed or dissolved in the ink carrier and is compatible with the other ink components.

The phase change ink compositions can be used in combination with conventional phase change ink colorant materials. The colorant may be present in the phase change ink in any desired or effective amount to obtain the desired color or hue such as, for example, at least from about 0.1 percent by weight of the ink to about 50 percent by weight of the ink, at least from about 0.2 percent by weight of the ink to about 20 percent by weight of the ink, and at least from about 0.5 percent by weight of the ink to about 10 percent by weight of the ink.

Ink Properties: Viscosity at Jetting Temperatures

The ink compositions generally have melt viscosities at the jetting temperature at about 5 to about 40 centipoise, which includes melt viscosities at the jetting temperature of about 10 to about 20 centipoise, about 5 to about 15 centipoise, and about 10 to about 11 centipoise. The term "jetting temperature" refers to the temperature of the ink at the print head and is typically between about 60° C. and 145° C., including between 60° C. and 120° C., between 100° C. and 120°, and between 120° C. and 145° C. In some embodiments, the "jetting temperature" is greater is than or equal to about 145° C. (e.g., about 140° C. to 160° C.).

In some embodiments, the temperature at which the ink forms the gel state is any temperature below the jetting temperature of the ink (e.g., at a temperature between 5° C. and 50° C. below the jetting temperature). In one embodiment, the ink may form a gel state at any temperature that is between about 5° C. and about 100° C. below the jetting temperature of the ink. This includes temperatures that are about 5° C. and about 25° C., about 25° C. and about 75° C., about 30° C. and about 60° C. or about 45° C. and about 55° C. below the jetting temperature of the ink.

A rapid and large increase in ink viscosity occurs upon cooling from the jetting temperature, at which the ink is in a liquid state, to the gel temperature, at which the ink is in the gel state. In some embodiments, the viscosity increase is from liquid state to gel state of the ink is, for example, from about 10 cps to about $10^9$ cps upon crystallization.

When the inks are in the gel state, the viscosity of the ink is in one embodiment at least about 1,000 centipoise, in another embodiment at least about 10,000 centipoise, and in yet another embodiment at least about 100,000 centipoise, although the viscosity can be outside of these ranges. Viscosity values in the gel state are in one embodiment at least about $10^3$ centipoise, and in another embodiment at least about $10^{4.5}$ centipoise, and in one embodiment no more than about $10^9$ centipoise, and in another embodiment no more than about $10^{6.5}$ centipoise, although the gel state viscosity can be outside of these ranges. The preferred gel phase viscosity can vary with the print process. For example, the highest viscosities are preferred when employing intermediate transfer, or when jetting directly to porous paper in order to minimize the effects of ink bleed and feathering. On the other hand, less porous substrates such as plastic may lead to the use of lower ink viscosities that control dot gain and agglomeration of individual ink pixels. The gel viscosity can be controlled by ink formulation and substrate temperature. An additional benefit of the gel state for radiation curable inks is that higher viscosities of about $10^3$ to about $10^4$ centipoise can reduce oxygen diffusion in the ink, which in turn can lead to a faster rate of cure in free radical initiation.

For printing applications wherein the ink is printed onto an intermediate transfer member and subsequently transferred to a final substrate, the viscosity of the ink in one specific embodiment increases to about $10^6$ centipoise or greater at the intermediate transfer member temperature to facilitate adhesion to the intermediate transfer member, and for printing applications wherein the ink is printed directly onto a final substrate, the viscosity of the ink in one specific embodiment increases to $10^6$ centipoise or greater at the final substrate temperature to prevent the ink from soaking into the final substrate and/or to facilitate adhesion to the final substrate until curing by exposure to radiation. In one specific embodiment, the temperature of the intermediate transfer member or the final substrate onto which the ink is printed and at which the ink viscosity increases to about $10^8$ centipoise or greater is about 100° C. or lower (e.g., about 90° C. or lower, about 80° C. or lower, or about 70° C. or lower). In some embodiments, the ink composition is a solid at room temperature.

Printing

The ink compositions can be prepared by any desired or suitable methods. For example, each of the components of the ink carrier can be mixed together, followed by heating, the mixture to at least its melting point. The colorant may be added before the ink ingredients have been heated or after the ink ingredients have been heated. When pigments are the selected colorants, the molten mixture may be subjected to grinding in an attritor or media mill apparatus to effect dispersion of the pigment in the ink carrier. The heated mixture is then stirred, to obtain a substantially homogeneous, uniform melt, followed by cooling the ink to ambient temperature (typically from about 20° C. to about 25° C.). The inks are solid at ambient temperature.

The inks can be employed in apparatus for direct printing ink jet processes and in indirect (offset) printing ink jet applications. Another embodiment disclosed herein is directed to a process which includes incorporating an ink as disclosed herein into an ink jet printing apparatus, melting the ink, and causing droplets of the melted ink to be ejected in an imagewise pattern onto a recording substrate or printing substrate. A direct printing process is also disclosed in, for example, U.S. Pat. No. 5,195,430, the disclosure of which is totally incorporated herein by reference. Yet another embodiment disclosed herein is directed to a process which including incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958 the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Substrates

Any suitable substrate or recording sheet can be employed, including plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX Digital Color Elite Gloss, Sappi Warren Papers LUSTROGLOSS, specialty papers such as Xerox DURAPAPER, and the like, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

For example, suitable polyester coated papers are known, reference for example U.S. Pat. Nos. 5,627,128; 5,534,479 and 4,692,636, incorporated herein by reference in their entireties. Other coated substrates are disclosed in U.S. Pat. No. 4,705,719, U.S. Pat. No. 4,868,581, U.S. Pat. No. 4,903,040, U.S. Pat. No. 4,903,041, U.S. Pat. No. 5,451,458, and U.S. Pat. No. 6,416,874, each of which is incorporated herein by reference in their entireties.

In some embodiments, the porosity values of the coated substrates for use with the inks of the present embodiments are less than the base uncoated substrates. That is, the coating process reduces the porosity of the base material or paper. In some embodiments, the porosity values of the coated substrates for use with the inks of the present embodiments may be less than about 100 mil per minute, without limitation.

The porosity values of the substrates, as measured with a Gurley Densometer, typically are at least about 15 seconds per 100 cubic centimeters of air, and typically are no more than about 60 seconds per 100 cubic centimeters of air, although the porosity value can be outside of these ranges. The cellulosic substrate typically has a thickness of at least about 50 microns, preferably at least about 90 microns, and more preferably at least about 100 microns, and typically has a thickness of no more than about 250 microns, preferably no more than about 200 microns, more preferably no more than about 175 microns, and even more preferably no more than about 125 microns, although the thickness can be outside of these ranges. In one embodiment, the coating of the Digital Color Elite Gloss (DCEG) paper is believed to be based on a styrene-butadiene or a styrene-acrylate copolymer having fillers such as calcium carbonate and/or aluminum hydroxide.

As disclosed herein, the phase change ink composition including at least two semi-crystalline materials may provide desirable print performance, e.g., against scratch, fold offset, smear, etc. In one example, the phase change ink composition may include amides and urethanes, which can form hydrogen bonding there-between and lead to improved scratch tape fold test, machine and manual fold test, tape test, etc.

In embodiments, image robustness of the K-proofed ink prints was evaluated using a "coin" scratch test and gouge scratch. The test looked at how much ink was removed from the coating after a "coin" tool with a beveled edge was run across the surface. For this test a modified Taber Industries Linear Abraser (Model 5700) with a custom "coin" scratch tip was used. The scratch attachment (mass of the "coin" holder, scratch tip, mounting) was 100 g and was lowered onto the test sample, which was then scratched for either 3 cycles or 9 cycles with a frequency of 25 cycles/minute. A two inch long scratch was examined to see what damage had occurred to the print. The amount of material removed from the coated paper was then measured by first scanning along the scratch length (flatbed scanner) and then using image analysis software to count the area of paper visible relative to the original amount of ink in the scratched area.

The gouge measurement is used to characterize the durability of the ink on recording sheets. It quantifies how well the ink adheres to the recording sheet (a measure of ink adhesion) and how well the ink adheres to itself (a measure of the cohesive strength of the ink or the toughness). A special machine called the Three Finger Gouge Tester is used to quantify gouge. The procedure entails dragging three "tuned" and weighted metal fingers against the image and measuring reflectance within the line edges using the automated Image Quality Analysis Facility.

As the term implies, fold durability relates to the ability of the ink (on the recording sheet) to be folded without cracking, breaking, and/or falling off the page leaving a line of missing ink. Fold is quantified by measuring reflectance within the line edges of the area of the fold crease using the automated Image Quality Analysis Facility. A solid fill is used since it is a stress case.

For the purposes of promoting an understanding of the embodiments described herein, reference will be made to embodiments and specific language will be used to describe the same. The terminology used herein is for the purpose of describing particular embodiments only, and is not intended to limit the scope of the present embodiments. As used throughout this disclosure, the singular forms "a," "an," and "the" include plural reference unless the context clearly dictates otherwise. Thus, for example, a reference to "a composition" includes a plurality of such compositions, as well as a single composition.

Unless otherwise defined, all technical and scientific terms used herein have the same meaning as commonly understood by one of ordinary skill in the art. Although methods and materials similar or equivalent to those described herein can be used in the practice or testing of the present embodiments, suitable methods and materials are described below. All publications, patent applications, patents, and other references mentioned herein are incorporated by reference in their entirety. In the case of conflict, the present specification, including definitions, will control. In addition, the materials, methods, and examples are illustrative only not intended to be limiting.

The Examples shown below are for illustration purpose only. Unless otherwise specified, the concentration of all materials is by weight.

EXAMPLES

Example 1

In this ink Example 1, about 48.2% of behenic acid methyl amide were melt mixed with about 48.2% of an isostearic acid gel diamide; about 3.35% of Blue Mustang dye; and about 0.2% of Naugard 445 (i.e., 4,4'-Bis($\alpha,\alpha$-dimethylbenzyl) diphenylamine, a highly effective non-discoloring aromatic amine type antioxidant that can be used as thermal stabilizer) for 1 hour. The resulting ink had a viscosity of about 11.5 cps at 140° C. and filtered well through a 1 micron Parker filter.

Example 2

In this ink Example 2, about 48.2% of a diurethane of Abitol/TMHDI/UNILIN 425 was melt mixed with about 48.2% of a UNICID 425 methylamide, about 3.35% of Blue Mustang dye; and about 0.2% of Naugard 445 for 1 hour. The resulting ink had a viscosity of about 12.0 cps at 140° C. and filtered through a 1 micron Parker filter.

Example 3

In this ink Example 3, about 48.2% of a diurethane of Abitol/TMHDI/UNILIN 425 was melt mixed with about 48.2% of a UNICID 350 methylamide, about 3.35% of Blue Mustang dye, and about 0.2% of Naugard 445 for 1 hour. The resulting ink had a viscosity of about 10.2 cps at 140° C. and filtered well through a 1 micron Parker filter.

Example 4

In this ink Example 4, about 48.2% of a diurethane of Abitol/TMHDI/UNILIN 550 was melt mixed with about 48.2% of a UNICID 350 methylamide, about 3.35% of Blue Mustang dye, and about 0.2% of Naugard 445 for 1 hour. The resulting ink had a viscosity of about 8.24 cps at 140° C. and filtered well through a 1 micron Parker filter.

Example 5

In this ink Example 5, similar to Example 2, about 43.2% of a diurethane of Abitol/TMHDI/UNILIN 425 was melt mixed with about 43.2% of a UNICID 425 methylamide, and about 10% of UNICID 425 to lower the jetting viscosity, 3.35% of Blue Mustang dye and about 0.2% of Naugard 445 for 1 hour. The resulting ink had a viscosity of about 9.9 cps at 140° C., a jettable viscosity of about 10.6 cps at about 135° C. and filtered well through a 0.45 micron Parker filter.

Figure 1:
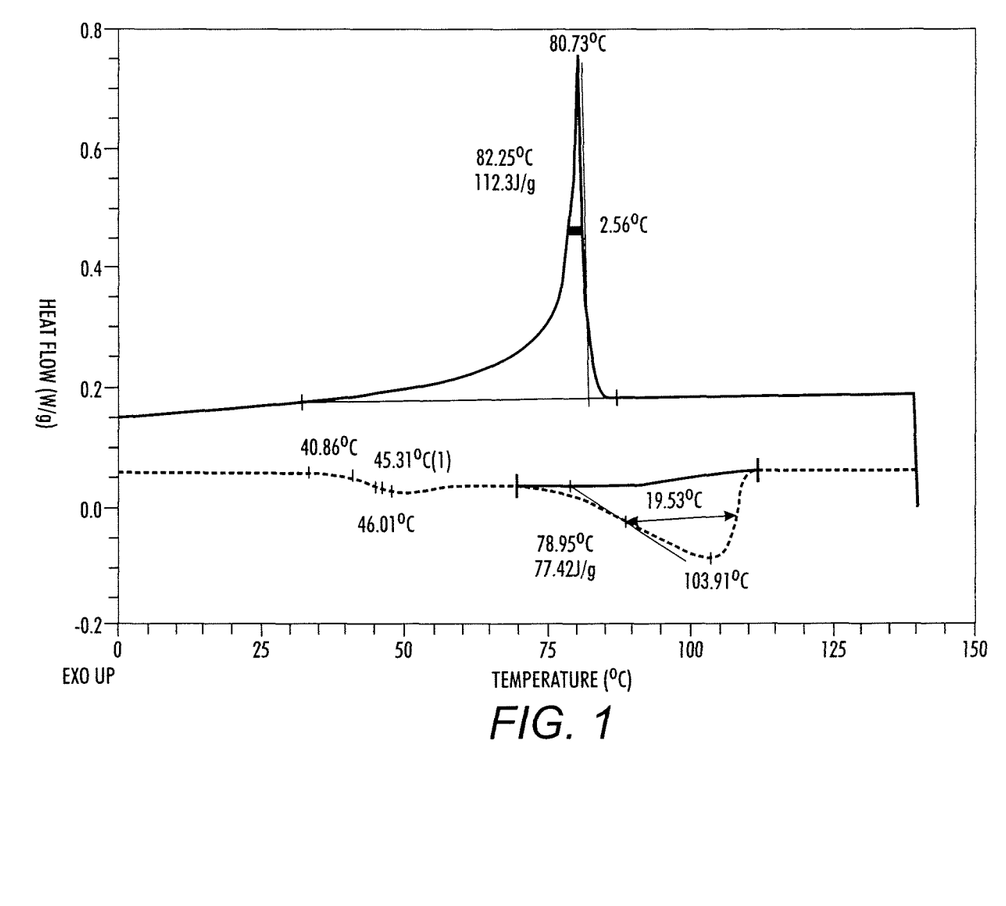
FIG. 1 is a Differential Scanning calorimetry (DSC) result of an exemplary semi-crystalline material having high amorphous content in accordance with various embodiments of the present teachings.

FIG. 1 is a Differential Scanning calorimetry (DSC) result of an exemplary semi-crystalline material having high amorphous content in accordance with various embodiments of the present teachings.

Figure 2:
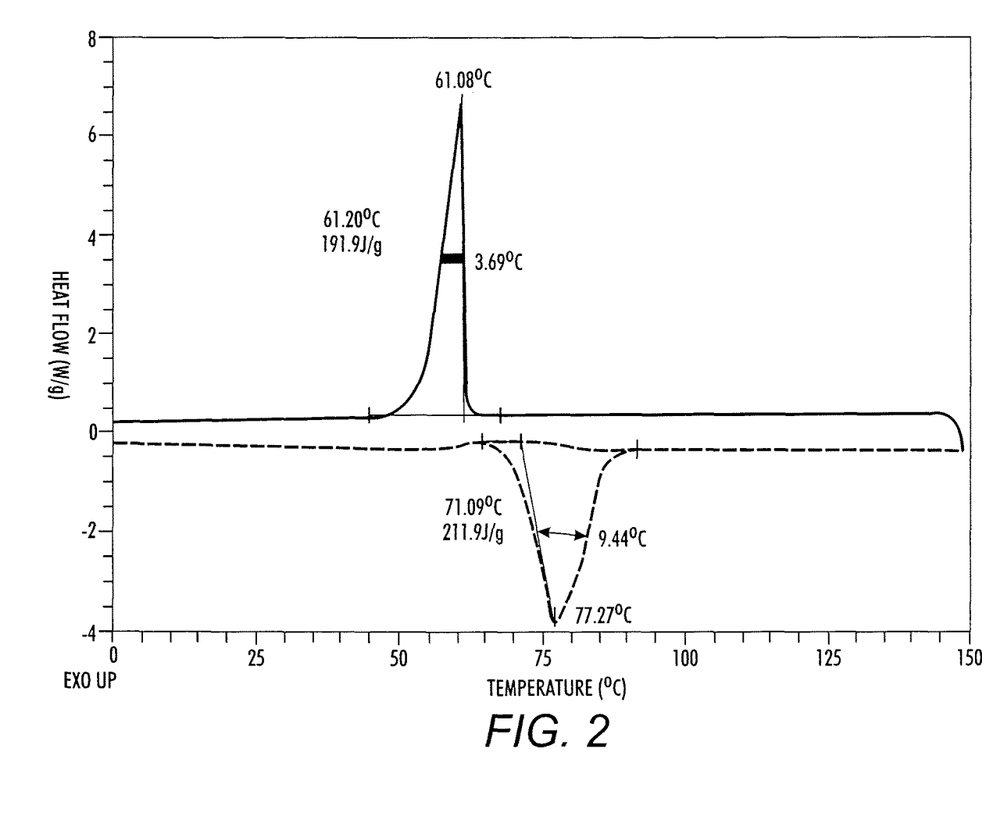
FIG. 2 is a DSC result of an exemplary semi-crystalline material having high crystalline content in accordance with various embodiments of the present teachings.

FIG. 2 is a DSC result of an exemplary semi-crystalline material having high crystalline content in accordance with various embodiments of the present teachings.

Example 6

DSC Result

In this example, a gel tetra-amide was made from reaction of PRIPOL 1006 Dimer Acid available from UNIQEMA, trans-1,2-diamino cyclohexane, and UNICID 550. DSC result of this example in FIG. 1 indicates characteristics of a semi-crystalline material having high amorphous content. The glass transition temperature (Tg), the melting, and crystallization transitions were observed. As shown, the start of crystallization of this sample is at about 86.52° C., peak of crystallization is at about 80.73° C., with completion of crystallization at about 40.04° C. The start of melting occurred at about 72.74° C., melting peak at about 103.91° C., and complete melting at about 112.02° C. Heat of fusion was about 75.31 J/g. Heat of the crystallization was about 102.5 J/g.

Example 7

DSC Result

DSC result of this example (i.e., a methylamide made with Behenic Acid) in FIG. 2 indicates characteristics of a semi-crystalline material having high crystalline content. The melting and sharp crystallization transitions were observed. As shown, the start of crystallization of the sample was at about 64.95° C., peak of crystallization is at about 61.08° C., with completion of crystallization at 46.31° C. The start of melting occurred at about 64.57° C., melting peak at about 77.27° C., and complete melting at about 90.67° C. No visible Tg was observed. Heat of fusion was about 211.5 J/g. Heat of the crystallization was about 191.2 J/g.

Example 8

Scratch and Fold Test

Various exemplary solid ink formulations have been measured by measurements of a Scratch and Fold Test, Machine and Manual Fold Test, etc. Scratch/gouge testing was performed using a Xerox developed three-finger gouge tester. A standard set of heavy, medium and light scratch fingers were applied to the page with a controlled normal force, and the substrate was moved underneath at a constant rate of motion. The prints were evaluated for the visibility of the scratch and amount of material removed using the automated Image Quality Analysis Facility. Fold testing was performed using a Duplo D-590 folder, with the image substrate tri-folded with a backing page. The folded substrate was then flattened and any loose material was brushed away from the printed surface. The backing page was assessed for ink offset during the folding. Fold crease was quantified using the automated Image Quality Analysis Facility.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A phase change ink comprising:
    at least a first semi-crystalline material having a higher amorphous content than a crystalline content therein; and
    at least a second semi-crystalline material having a higher crystalline content than an amorphous content therein, such that the phase change ink has a viscosity ranging from about 0.1 cps to about 15 cps at a temperature ranging from about 60° C. to about 145° C., wherein the first semi-crystalline material having the higher amorphous content has a $T_g$ value of from about −50° C. to about 100° C.

2. The phase change ink of claim 1, wherein the phase change ink has a viscosity ranging from about 7 cps to about 15 cps at said temperature.

3. The phase change ink of claim 1, wherein the phase change ink has a viscosity ranging from about $10^8$ cps or greater at room temperature.

4. The phase change ink of claim 1, wherein the phase change ink has a total crystalline content and a total amorphous content in a weight ratio of from about 65:35 to about 95:5.

5. The phase change ink of claim 1, wherein the first semi-crystalline material having the higher amorphous content comprises a material selected from the group consisting of gel di-amides, tetra-amides having straight and branched carbon chains, gel tetra-amides, urethanes, and combinations thereof.

6. The phase change ink of claim 1, wherein the second semi-crystalline material having the higher crystalline content comprises methyl-amides with straight chain acids.

7. The phase change ink of claim 1, wherein the second semi-crystalline material having the higher crystalline content has a viscosity of from about 0.1 to about 10 cps at said temperature.

8. The phase change ink of claim 1, wherein the second semi-crystalline material having the higher crystalline content exhibits crystallization ($T_{crys}$) and melting ($T_{melt}$) peaks according to differential scanning calorimetry (DSC) and the difference between the peaks ($T_{melt}-T_{crys}$) is less than about 55° C.

9. The phase change ink of claim 1, wherein the second semi-crystalline material having the higher crystalline content has a melting point below said temperature.

10. The phase change ink of claim 1, wherein the first semi-crystalline material having the higher amorphous content has a viscosity of from about 10 to about 1000 cps at said temperature.

11. The phase change ink of claim 1, wherein the first semi-crystalline material having the higher amorphous content has a viscosity at least $10^8$ cps at room temperature.

12. The phase change ink of claim 1, wherein the first semi-crystalline material having the higher amorphous content has a molecular weight from about 250 g/mol to about 3000 g/mol.

13. A method of printing, comprising:
    incorporating a phase change ink into an ink jet printing apparatus, wherein the phase change ink comprises at least a first semi-crystalline material having a high amorphous content, and at least a second semi-crystalline material having a high crystalline content, such that the phase change ink has a viscosity ranging from about 0.1 cps to about 15 cps at a temperature ranging from about 60° C. to about 145° C., wherein the first semi-crystalline material having the higher amorphous content has a $T_g$ value of from about −50° C. to about 100° C.;
    melting the phase change ink inside the ink jet printing apparatus; and
    causing droplets of the melted ink to be ejected onto a substrate to form an image.

14. The method of claim 13, wherein the substrate is a final recording sheet and droplets of the melted ink are ejected in an imagewise pattern directly onto the final recording sheet.

15. The method of claim 13, wherein the substrate is a coated substrate.

16. The method of claim 13, wherein the substrate is an uncoated substrate.

* * * * *